United States Patent
Kim et al.

(10) Patent No.: US 11,748,862 B2
(45) Date of Patent: Sep. 5, 2023

(54) IMAGE PROCESSING APPARATUS INCLUDING NEURAL NETWORK PROCESSOR AND METHOD OF OPERATION

(71) Applicant: SAMSUNG ELECTRONICS CO., LTD., Suwon-si (KR)

(72) Inventors: Irina Kim, Seoul (KR); Seongwook Song, Seoul (KR)

(73) Assignee: SAMSUNG ELECTRONICS CO., LTD.

(*) Notice: Subject to any disclaimer, the term of this patent is extended or adjusted under 35 U.S.C. 154(b) by 258 days.

(21) Appl. No.: 17/147,067

(22) Filed: Jan. 12, 2021

(65) Prior Publication Data

US 2022/0005168 A1 Jan. 6, 2022

(30) Foreign Application Priority Data

Jul. 3, 2020 (KR) .................. 10-2020-0082268

(51) Int. Cl.
*G06N 3/063* (2023.01)
*G06T 3/40* (2006.01)
(Continued)

(52) U.S. Cl.
CPC .............. *G06T 5/50* (2013.01); *G06N 3/063* (2013.01); *G06T 3/4015* (2013.01);
(Continued)

(58) Field of Classification Search
CPC ..... G06N 3/063; G06T 3/4015; G06T 3/4038; G06T 5/002; G06T 5/003; G06T 5/50;
(Continued)

(56) References Cited

U.S. PATENT DOCUMENTS 7,034,874 B1 4/2006 Reinhart et al.
8,860,851 B2 10/2014 Goma et al.
(Continued)

FOREIGN PATENT DOCUMENTS

JP 1996009264 A 1/1996
JP 1999205687 A 7/1999
(Continued)

OTHER PUBLICATIONS

Ratnasingam ("Deep Camera: A Fully Convolutional Neural Network for Image Signal Processing," IEEE/CVF International Conference on Computer Vision Workshop; Date of Conference: Oct. 27-28, 2019) (Year: 2019).*
(Continued)

*Primary Examiner* — Yubin Hung
(74) *Attorney, Agent, or Firm* — Fish & Richardson P.C.

(57) ABSTRACT

An image processing apparatus includes; an image sensor including pixels that generate first image data, and an image processing system. The image processing system includes; a neural network processor that performs a cluster-level bad pixel correction operation on the first image data based on first coordinate information associated with first-type bad pixel clusters to generate second image data, and a main processor that performs a post-processing operation on the second image data to generate third image data.

20 Claims, 15 Drawing Sheets

(51) Int. Cl.
*G06T 5/00* (2006.01)
*G06T 5/50* (2006.01)
(52) U.S. Cl.
CPC ............ *G06T 3/4038* (2013.01); *G06T 5/002* (2013.01); *G06T 5/003* (2013.01); *G06T 2207/10024* (2013.01); *G06T 2207/20084* (2013.01); *G06T 2207/20221* (2013.01)
(58) Field of Classification Search
CPC . G06T 2207/10024; G06T 2207/20084; G06T 2207/20221
See application file for complete search history.

(56) References Cited

U.S. PATENT DOCUMENTS

| | | | |
|---|---|---|---|
| 9,253,459 | B2 | 2/2016 | Tachi |
| 9,807,324 | B2 | 10/2017 | Kong |
| 10,348,989 | B2 | 7/2019 | Fujita |
| 10,404,930 | B2 | 9/2019 | Shin et al. |
| 2006/0177126 | A1 | 8/2006 | Han |
| 2016/0142659 | A1* | 5/2016 | Shin ................... H04N 5/367 348/246 |
| 2018/0253624 | A1* | 9/2018 | Schafer ................ G06K 9/6271 |
| 2020/0077026 | A1 | 3/2020 | Jeong et al. |
| 2020/0162719 | A1* | 5/2020 | Tadi .......................... G06T 5/50 |
| 2021/0150660 | A1* | 5/2021 | An .......................... G06F 17/18 |
| 2021/0319730 | A1* | 10/2021 | Verbeure .............. G09G 3/3696 |

FOREIGN PATENT DOCUMENTS

| | | |
|---|---|---|
| KR | 1020190100833 | 8/2019 |
| WO | WO-2020010638 A1 * | 1/2020 |

OTHER PUBLICATIONS

Chen et al. ("Low complexity photo sensor dead pixel detection algorithm," IEEE Asia Pacific Conference on Circuits and Systems; Date of Conference: Dec. 2-5, 2012) (Year: 2012).*

Li et al. ("A unified approach to bad pixel removal and adaptive CFA demosaicking," TENCON 2012 IEEE Region 10 Conference; Date of Conference: Nov. 19-22, 2012) (Year: 2012).*

Kim et al., Deep Image Demosaicing for Submicron Image Sensors, Journal of Imaging Science and Technology, 060410-1-060410-12, Nov.-Dec. 2019, Society for Imagin Science and Technology 2019, Korea.

* cited by examiner

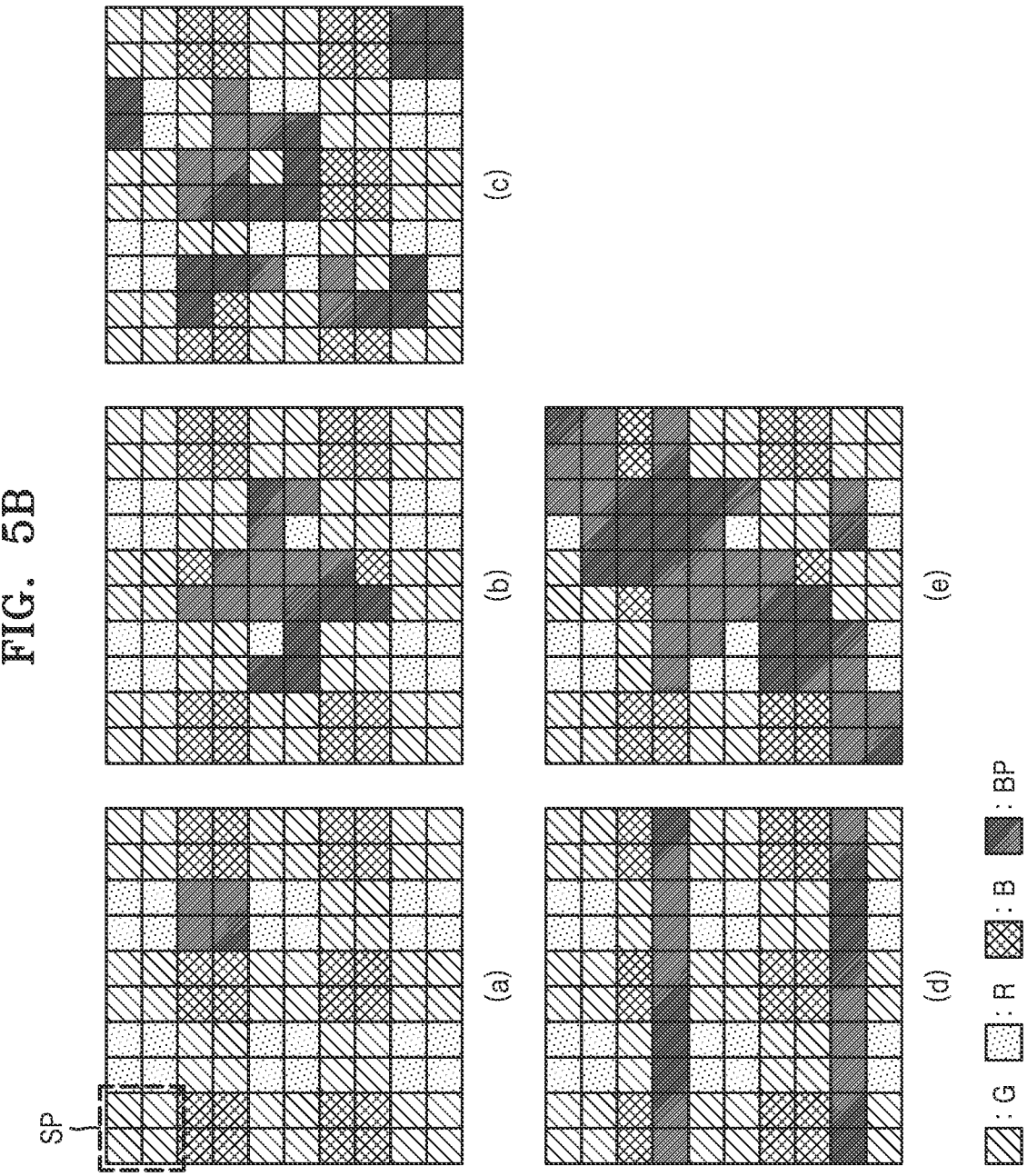

IMAGE PROCESSING APPARATUS INCLUDING NEURAL NETWORK PROCESSOR AND METHOD OF OPERATION

CROSS-REFERENCE TO RELATED APPLICATION

This application claims the benefit of Korean Patent Application No. 10-2020-0082268 filed on Jul. 3, 2020 in the Korean Intellectual Property Office, the subject matter of which is hereby incorporated by reference.

BACKGROUND

Embodiments of the inventive concept relates to image processing apparatuses and image processing systems that perform an image processing operation using a neural network processor, as well as methods of operating same.

Recently, as the demand for high-quality and high-resolution pictures and images has increased, the size of pixels in an image sensor has been reduced as a greater number of pixels are accommodated. Thus, due to certain process issues, pixels of image processing apparatuses may include bad pixels occurring in arbitrary shape(s) and arbitrary position(s).

Because a relatively large number of bad pixels having an arbitrary shape may not be used to generate desired images, the performance of the image processing apparatus may be degraded. Accordingly, a technique for correcting pixel data associated with bad pixels is required. However, the bad pixels may occur in isolation, or in clusters in unpredictable ways and times, and may result is varied performance. Accordingly, an approach to bad pixel correction taking into account both isolated bad pixels and clusters of bad pixels is needed.

SUMMARY

Embodiments of the inventive concept provide an image processing apparatus, an image processing system and methods of operating same that appropriately correct pixel data output from a pixel array including bad pixels (first-type or cluster type bad pixels and/or second-type or isolated pixel type bad pixels) using a neural network processor.

According to an aspect of the inventive concept, there is provided an image processing apparatus including; an image sensor including pixels that generate first image data; and an image processing system. The image processing system includes; a neural network processor configured to perform a cluster-level bad pixel correction operation on the first image data based on first coordinate information associated with first-type bad pixel clusters to generate second image data, and a main processor configured to perform a post-processing operation on the second image data to generate third image data.

According to an aspect of the inventive concept, there is provided an image processing system including; a preprocessor that receives first tetra data and includes a bad pixel module that performs a pixel-level bad pixel correction operation on the first tetra data to generate pixel-level corrected first tetra data, a neural network processor including a bad pixel network module that receives the pixel-level corrected first tetra data and performs a cluster-level bad pixel correction operation based on coordinate information to generate second tetra data, and a main processor that receives the second tetra data, and includes a remosaic module that converts the second tetra data into corresponding data having a Bayer pattern, a demosaic module that converts the data having the Bayer pattern in corresponding data having a red-green-blue (RGB) pattern, a denoising module that removes noise from the data having the RGB pattern, and a sharpening module that performs a sharpening operation on the data having the RGB pattern.

According to an aspect of the inventive concept, there is provided a method of operating an image processing apparatus including an image sensor including pixels, a neural network processor and a main processor. The method includes; generating first image data using the pixels, performing a cluster-level bad pixel correction operation on the first image data using the neural network processor and based on coordinate information associated with a cluster including a bad pixel from among the pixels to generate second image data, and performing a post-processing operation on the second image data using the main processor to generate third image data.

BRIEF DESCRIPTION OF THE DRAWINGS

Embodiments of the inventive concept will be more clearly understood from the following detailed description taken in conjunction with the accompanying drawings in which:

FIGS. 5A and 5B are respective conceptual diagrams further illustrating the occurrence of bad pixels in a pixel array;

DETAILED DESCRIPTION

Hereinafter, embodiments of the inventive concept will be described in some additional detail with reference to the accompanying drawings.

Figure 1:
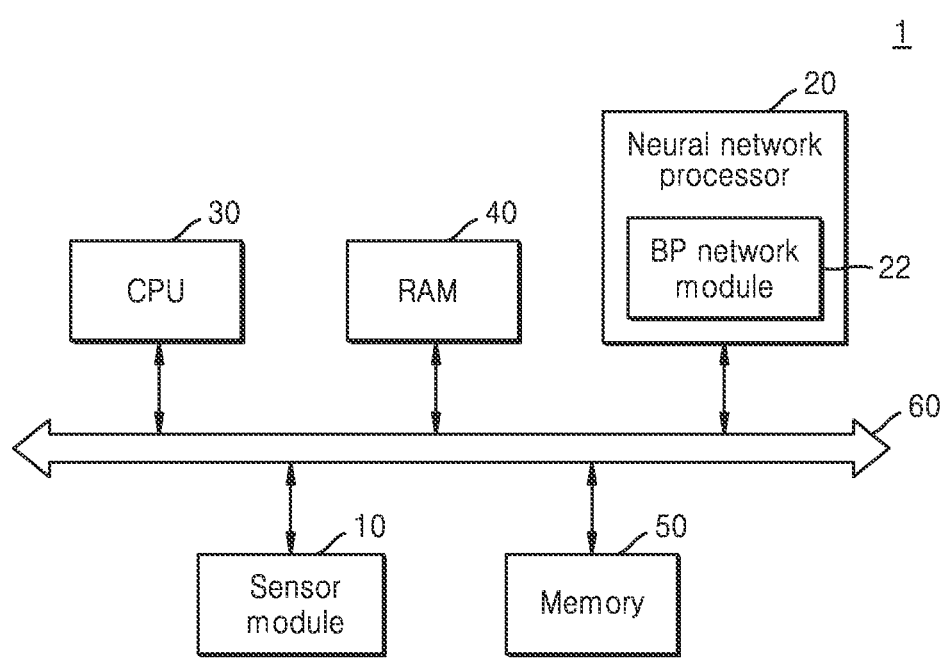
FIG. 1 is a block diagram illustrating a neural network system according to embodiments of the inventive concept.

Figure (FIG. 1 is a block diagram illustrating a neural network system 1 according to embodiments of the inventive concept.

The neural network system 1 may train a neural network, and analyze input data using the (trained) neural network to decide certain information regarding the input data. In some embodiments, the neural network system 1 may decide information associated with functions, conditions, component state(s), component control(s), etc. for an electronic device incorporating the neural network system 1. In this regard, during the deciding process(es), the neural network system 1 may develop inferred information from the input data.

As examples of possible incorporating electronic devices, the neural network system 1 may be variously applied (e.g.,) to smartphones, tablet devices, smart televisions (TVs), augmented reality (AR) devices, Internet of Things (IoT) devices, autonomous vehicles, robots, medical devices, drones, advanced drivers assistance systems (ADAS), image display devices, measuring devices, etc. The neural network system 1 may be variously applied to facilitate the performing (or execution) of (e.g.,) a voice recognition operation, an image recognition operation, an image classification operation, an image processing operation, etc.

The neural network system 1 may be variously incorporated (e.g., mechanically mounted and/or electrically connected) by an electronic device. In this regard, the neural network system 1 may be internally provided within the electronic device and/or externally associated with the electronic device. In some embodiments, the neural network system 1 may be an application processor (AP).

Hereinafter, it will be assumed that the neural network system 1 has been competently applied to an incorporating electronic device capable of performing digital image processing, and more particularly a bad pixel correction operation for at least one cluster including bad pixels associated with a sensor module.

Referring to FIG. 1, the neural network system 1 may include a sensor module 10, a neural network processor (or a neural network device) 20, a central processing unit (CPU) 30, random access memory (RAM) 40, a memory 50, and a bus 60 capable of variously connecting the other components of the neural network system 1. As will be appreciated by those skilled in the art, the neural network system 1 may further include one or more input/output (I/O) module(s), a security module, a power control module, and various, additional processors. Here, each module or component in the neural network system 1 may be variously implemented in hardware, firmware and/or software, where corresponding software modules may be executed using dedicated or general purpose hardware components.

In some embodiments, some or all of components of the neural network system 1 may be implemented on a single semiconductor chip. For example, the neural network system 1 may be implemented as a System-on-Chip (SoC). In some embodiments, the neural network system 1 may be referred to as an image chip.

The CPU 30 may be used to control the operation of the neural network system 1. Here, the CPU 30 may include a single core or multiple processor cores. The CPU 30 may be used to perform (or execute) various operations and/or programs associated with the programming (or writing), reading, erasing and/or maintenance of data in relation to the RAM 40 and/or the memory 50.

The CPU 30 may execute an application program that controls the neural network processor 20 to perform various tasks associated with the neural network processor 20. In this regard, the neural network processor 20 may include at least one (of potentially many different kinds of) neural network model, such as (e.g.,) a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, deep belief network (DBN), a restricted Boltzmann machine (RBM), a fully convolutional network, a long short-term memory (LSTM) network, a classification network, a plain residual network, a dense network, a hierarchical pyramid network, a fully convolutional network, etc.

The neural network processor 20 may perform one or more neural network operation(s) in relation to input data stored in RAM 40 and/or memory 50 in order to generate a resulting information signal. The neural network processor 20 may be implemented as a neural network operation accelerator, a coprocessor, a digital signal processor (DSP), an application specific integrated Circuit (ASIC), etc.

Assuming the exemplary configuration of FIG. 1, the sensor module 10 may be used to collect various information generally associated (internally or externally) with the incorporating electronic device. For example, the sensor module 10 may sense or receive various sensor input signal(s) (e.g., an image signal or an optical signal, an audio signal, a magnetic signal, a biometric-signal, a touch signal, etc.) applied to, or detected in relation to the electronic device. The sensor input signals may then be converted into corresponding sensing data. To this end, the sensor module 10 may include one or more sensing device(s), such as (e.g.,) a microphone, an image capture device, a camera, an image sensor, a light detection and/or ranging (LIDAR) sensor, an ultrasonic sensor, an infrared (IR) sensor, a biosensor, a touch sensor, etc.

In some embodiments, the sensing data may be provided as input data to the neural network processor 20. Alternately or additionally, the input data may be stored in the memory 50 and thereafter provided to the neural network processor 20. In some embodiments, the neural network processor 20 may include a graphics processing unit (GPU) configured to process image data. Under this assumption, the sensing data may be processed by the GPU and provided to the memory 50 and/or the neural network processor 20.

Thus, the sensor module 10 may include an image sensor capable of capturing an image associated with the external environment surrounding the electronic device and generating image data. The resulting image data provided by the sensor module 10 may be provided to the neural network processor 20 and/or stored in the memory 50 for subsequent processing by the neural network processor 20.

Extending this example, the neural network processor 20 may receive image data from the sensor module 10 (or the memory 50) and perform a neural network operation based on the image data. In this regard, the neural network processor 20 may include a bad pixel (BP) network module 22 associated with a neural network operation based on one or more neural network model(s).

Thus, the BP network module 22 may detect on a cluster-level, certain bad pixels from among the plurality of pixels included in an image sensor of the sensor module 10 (hereafter collectively or partially referred to as "image sensor pixels"). The BP network module 22 may then correct bad pixel data output by the cluster-level bad pixels. Hereinafter, an operation of correcting bad pixel data output by bad pixel(s) will be referred to as a bad pixel correction operation. Examples of cluster-level bad pixels including bad pixels will be described in some additional detail with reference to FIG. 6B.

In some embodiments, the BP network module 22 may receive first image data generated by the image sensor of the sensor module 10, and perform a cluster-level bad pixel correction operation on the first image data to generate cluster-level corrected first image data. The cluster-level bad pixel correction operation may be based on first coordinate information identifying the location(s) of bad pixel clusters (each bad pixel cluster including at least two (2), first-type bad pixels) among the image sensor pixels. In this manner, the cluster-level bad pixel correction operation may generate second image data from the first image data.

More specifically, the BP network module 22 may detect and select various image data associated with one or more region(s) of interest (hereafter, "ROI data") included in the first image data and based on first coordinate information. The resulting "selected bad pixel data" may correspond to the image data associated with the ROI data, and a cluster-level bad pixel correction operation may be performed using the selected bad pixel data. Here, for example, the first coordinate information may include coordinates of pixel data respectively corresponding to the ROI data.

In some embodiments, the first coordinate information may be generated, wholly or in part, from masking information indicating coordinates (or positions) of bad pixels among the image sensor pixels and derived (e.g.,) during the manufacture/testing of the image sensor. That is, the neural network processor 20 may analyze the masking information and generate the first coordinate information, wherein the first coordinate information may be used to optimally perform the cluster-level bad pixel correction. In some embodiments, the first coordinate information may be stored in the memory 50.

Thus, in order to perform the cluster-level bad pixel correction operation, the BP network module 22 may access the memory 50 in order to read the first coordinate information. In addition, the first coordinate information may be periodically or dynamically updated based on (e.g.,) a period of use for the image sensor, one or more characteristics of bad pixel(s), and/or other external factors.

In some embodiments, the BP network module 22 may perform a pixel-level bad pixel correction operation on the first image data received from the sensor module 10 based on second coordinate information associated with second-type bad pixels (e.g., isolated bad pixels) among image sensor pixels in order to generate pixel-level corrected first image data.

In this manner, the BP network module 22 may perform a bad pixel correction operation including a cluster-level bad pixel correction operation based on the first coordinate information and/or a pixel-level bad pixel correction operation based on the second coordinate information. Here, the second coordinate information may be obtained from masking information stored in the memory 50.

In some embodiments, the BP network module 22 may preferentially perform the pixel-level bad pixel correction operation on the first image data, and then perform the cluster-level bad pixel correction operation to generate the second image data. In another embodiment, the pixel-level bad pixel correction operation may be performed by another processor (e.g., the CPU 30), and the BP network module 22 may perform the cluster-level bad pixel correction operation on the first image data in parallel with the performing of the pixel-level bad pixel correction operation on the first image data. Subsequently, the first image data on which the pixel-level bad pixel correction operation has been performed may be merged with the first image data on which the cluster-level bad pixel correction operation has been performed.

In some embodiments, the neural network processor 20 may perform a reconstruction operation on image data, once the one or more bad pixel correction operation(s) have been performed. In this regard, the reconstruction operation may be used to convert the format of image data. For example, the reconstruction operation may convert image data having a tetra format (described below) into image data having a Bayer format, a red-green-blue (RGB) format, or YUV format.

The neural network processor 20 may perform a reconstruction operation which is complementary to the reconstruction operation performed on the image data by the CPU 30. Alternately, the neural network processor 20 may exclusively perform the reconstruction operation.

In some embodiments, the neural network processor 20 may perform one or more pre-processing operation(s) and/or one or more post-processing operation(s) on the image data in addition to the reconstruction operation. The neural network processor 20 may perform a pre-processing operation or a post-processing operation, which is complementary to a pre-processing operation or a post-processing operation performed by the CPU 30 on the image data. Alternately, the neural network processor 20 may exclusively perform pre-processing operation(s) and/or post-processing operation(s). The neural network processor 20 may perform the above-described operation(s) using the RAM 40 and/or the memory 50.

In the illustrated example of FIG. 1, the memory 50 may include a volatile memory and/or a non-volatile memory. The non-volatile memory may include read-only memory (ROM), programmable ROM (PROM), electrically programmable ROM (EPROM), electrically erasable and programmable ROM (EEPROM), flash memory, phase-change random access memory (PRAM), magnetic RAM (MRAM), resistive RAM (RRAM), and/or ferroelectric RAM (FRAM). The volatile memory may include dynamic RAM (DRAM), static RAM (SRAM), synchronous DRAM (SDRAM), PRAM, MRAM, RRAM, and/or FRAM.

In some embodiments, the memory 50 may include at least one of a hard disk drive (HDD), a solid-state drive (SSD), a compact flash (CF) card, a secure digital (SD) card, a micro-SD card, a mini-SD card, an extreme digital (xD) card, and a memory stick.

Figure 2:
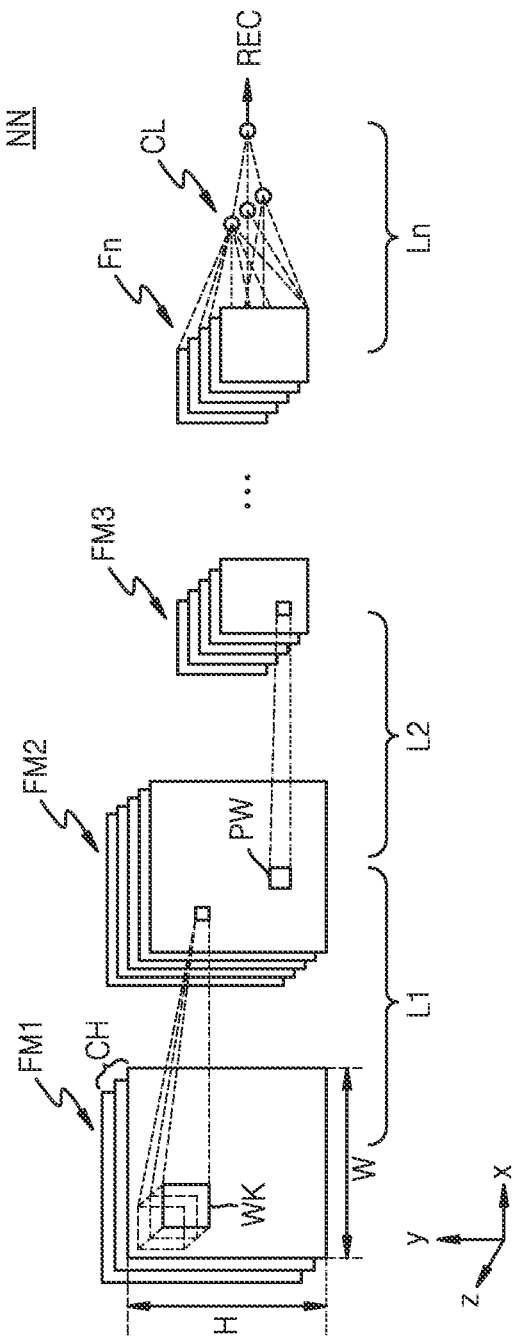
FIG. 2 is a conceptual diagram illustrating one possible neural network structure according to embodiments of the inventive concept.

FIG. 2 is a conceptual diagram illustrating in one example a structure for a neural network that may be used in embodiments of the inventive concept. For example, the neural network of FIG. 2 may be applied to the neural network processor 20 of FIG. 1.

Referring to FIG. 2, a neural network (NN) may include multiple layers (e.g., first to n-th layers, L1 to Ln). Such a multi-layered neural network may be referred to as a deep neural network or a deep learning architecture. Each of the layers L1 to Ln may be a linear layer or a nonlinear layer. In some embodiments, a particular layer may include a combination of at least one linear layer and at least one nonlinear layer. For example, the linear layer may include a convolution layer or a fully connected layer, and the nonlinear layer may include a pooling layer or an activation layer.

In the illustrated example of FIG. 2, the first layer L1 may include a convolution layer, the second layer L2 may include a pooling layer, and the n-th layer Ln may include (e.g.,) a fully connected layer as an output layer. The neural network may further include an activation layer and/or other layer(s) configured to perform different kinds of operations.

Each of the first to n-th layers L1 to Ln may (1) receive an input image frame or a feature map generated by a previous (or preceding) layer as an input feature map, (2) perform an operation on the input feature map, and (3) generate an output feature map or a recognition signal REC. Here, the feature map may refer to data in which various features of input data are expressed. First to n-th feature maps FM1, FM2, FM3, ..., and FMn may have, for example, a two-dimensional (2D) matrix form or a three-dimensional (3D) matrix form (or referred to as a tensor) including a plurality of feature values. The first to n-th feature maps FM1, FM2, FM3, ..., and FMn may have a width W (or referred to as a column), a height H (or referred to as a row), and a depth D, which may respectively correspond to an x-axis, a y-axis, and a z-axis on coordinates. In this case, the term depth D may be referred to a number of channels.

The first layer L1 may convolute the first feature map FM1 with a weight map WM and generate the second feature map FM2. The weight map WM may have a 2D matrix form or a 3D matrix form including a plurality of weight values. The weight map WM may be referred to as a kernel. The weight map WM may filter the first feature map FM1 and be referred to as a filter or a kernel. A depth (i.e., the number of channels) of the weight map WM may be equal to a depth of the first feature map FM1 (i.e., the number of channels), and channels of the weight map WM may be respectively convoluted with channels of the first feature map FM1 corresponding thereto. The weight map WM may be traversed and shifted using the first feature map FM1 as a sliding window. During each shift, each of weights included in the weight map WM may be multiplied by and added to all feature values in a region where each of the weight values included in the weight map WM overlaps with the first feature map FM1. By convoluting the first feature map FM1 with the weight map WM, one channel of the second feature map FM2 may be generated. Although one weight map WM is indicated in FIG. 2, a number of weight maps may be substantially convoluted with the first feature map FM1 to generate a number of channels of the second feature map FM2. In other words, the number of channels of the second feature map FM2 may correspond to the number of weight maps.

The second layer L2 may change a spatial size of the second feature map FM2 using a pooling operation and generate the third feature map FM3. The pooling operation may be referred to as a sampling operation or a down-sampling operation. A 2D pooling window PW may be shifted on the second feature map FM2 in units of size of the pooling window PW, and a maximum value (or average value) of feature values in a region that overlaps with the pooling window PW may be selected. Thus, the third feature map FM3 having a changed spatial size may be generated from the second feature map FM2. The number of channels of the third feature map FM3 may be equal to the number of channels of the second feature map FM2.

The n-th layer Ln may classify a class CL of the input data by combining features of the n-th feature map FMn, and generate a recognition signal REC corresponding to the class CL.

Figure 3:
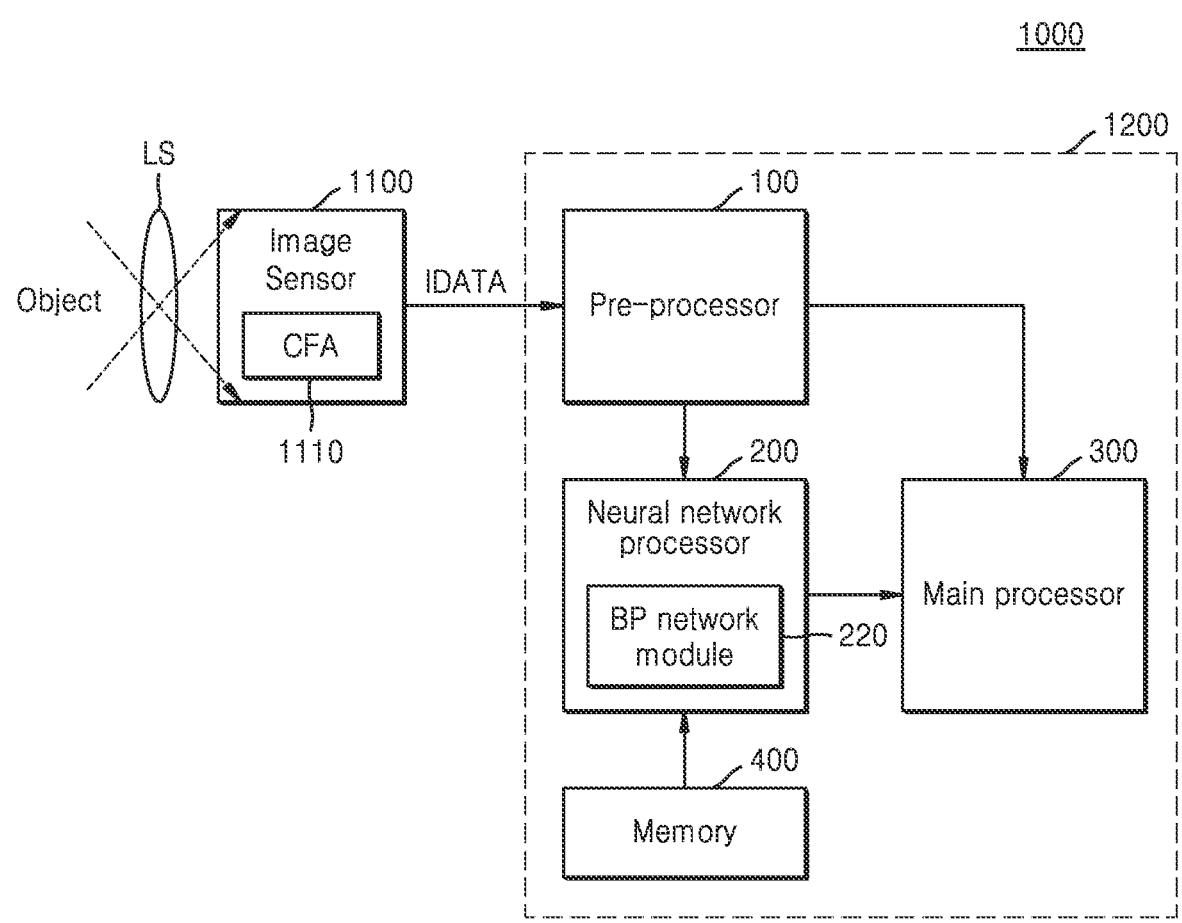
FIG. 3 is a block diagram illustrating an image processing apparatus according to embodiments of the inventive concept.

FIG. 3 is a block diagram illustrating an image processing apparatus 1000 according to embodiments of the inventive concept.

The image processing apparatus 1000 may be incorporated or implemented as an electronic device configured to capture an image, display the captured image, and/or perform an operation on the captured image. The image processing apparatus 1000 may be incorporated or implemented as, for example, a personal computer (PC), an Internet of Things (IoT) device, or a portable electronic device. The portable electronic device may include laptop computers, mobile phones, smartphones, tablet PCs, personal digital assistants (PDAs), enterprise digital assistants (EDAs), digital still cameras, digital audio cameras, audio devices, portable multimedia players (PMPs), personal navigation devices (PNDs), MPEG-1 audio layer 3 (MP3) players, handheld game consoles, electronic books (e-books), or wearable devices. Alternately, the image processing apparatus 1000 may be incorporated in various electronic devices associated with drones, ADASs, vehicles, furniture, manufacturing facilities, doors, measuring devices, etc.

Referring to FIG. 3, the image processing apparatus 1000 may generally include an image sensor 1100 and an image processing system 1200.

The image processing apparatus 1000 may include a variety of components, such as a display, a user interface, etc.

The image processing system 1200 illustrated in FIG. 3 includes a pre-processor 100, a neural network processor 200, a main processor 300 and a memory 400. The pre-processor 100, the neural network processor 200, and the main processor 300 may be implemented as a single semiconductor chip or a set of semiconductor chips. For example, the image processing system 1200 and/or the image processing apparatus 1000 may be implemented as a System-on-Chip (SoC). Although the pre-processor 100 and the main processor 300 are shown as separate components in FIG. 3, the inventive concept is not limited thereto, and the pre-processor 100 and the main processor 300 may be commonly implemented, wholly or in part.

The image sensor 1100 may include a color filter array (CFA) 1110 having a predetermined pattern. In this regard, the image sensor 1100 may be used to convert an optical signal associated with an object and incident to an optical lens LS into a corresponding electrical signal using the color filter array 1110 in order to generate the first image data (IDATA).

The color filter array 1110 may be implemented to support one or more patterns, such as Bayer pattern(s), tetra pattern(s), etc. For example, the color filter array 1110 may have patterns corresponding to tetra cells or patterns corresponding to nonacells. Hereinafter, it will be assumed that the color filter array 1110 corresponds to tetra patterns. However, the inventive concept is not limited thereto.

The image sensor 1100 may include, for example, a pixel array of arranged (e.g., two-dimensionally arranged) pixels and a readout circuit. The pixel array may be used to convert the incident optical signal(s) into corresponding electrical signal(s). The pixel array may be implemented as a photo-electric conversion device, such as a charge-coupled device (CCD), a complementary-metal-oxide-semiconductor (CMOS) device, or various other photoelectric conversion devices. The readout circuit may generate raw data based on the electrical signal provided from the pixel array and output the raw data from which noise may be removed as the first image data. The image sensor 1100 may be implemented as a semiconductor chip or package including a pixel array and a readout circuit.

In some embodiments, the pre-processor 100 may be used to perform at least one pre-processing operation, such as a crosstalk (X-talk) correction operation, a pixel-level bad pixel correction operation, etc., in relation to the first image data.

In the illustrated example of FIG. 3, the neural network processor 200 is assumed to include a BP network module 220, wherein the BP network module 220 may be used to perform a cluster-level bad pixel correction operation on the first image data. As an example, the BP network module 220 may (1) read first coordinate information from the memory 400, (2) select ROI data from the first image data IDATA based on the first coordinate information, (3) detect bad pixel data corresponding to clusters including the bad pixels among the ROI data, and (4) perform the cluster-level bad pixel correction operation.

With this configuration, for example, the BP network module 220 may perform a cluster-level bad pixel correction operation in parallel with the pixel-level bad pixel correction operation performed by the pre-processor 100. Thereafter, the main processor 300 may be used to merge the first image data on which the pixel-level bad pixel correction operation has been performed by the pre-processor 100 with the first image data on which the cluster-level bad pixel correction operation has been performed by the neural network processor 200. One or more post-processing operation(s) may then be performed on the merged first data.

In some embodiments, the neural network processor 200 may perform all or some of pre-processing operations performed by the pre-processor 100, instead of using the pre-processor 100. For example, the neural network processor 200 may perform the X-talk correction operation and the pixel-level bad pixel correction operation on the first image data.

The image sensor pixels included in the image sensor 1100 may include a static bad pixel and/or at dynamic bad pixel. Here, a static bad pixel may continuously output bad pixel data regardless of environmental factors and noise. In contrast, the dynamic bad pixel may output either bad pixel data or normal pixel data depending on various factors, such as environment factors and/or noise.

Thus, the BP network module 220 may detect bad pixel data in the first image data resulting from a static bad pixel based on the masking information, and correct the bad pixel data. Alternately or additionally, the BP network module 220 may detect bad pixel data in the first image data resulting from a dynamic bad pixel based on the masking information and patterns of respective pixel data values of the first image data, and correct the detected pixel data. The BP network module 220 may subsequently perform a cluster-level bad pixel correction operation on the first image data on which the pixel-level bad pixel correction operation has been performed.

The main processor 300 may perform post-processing operations including a remosaic operation and a demosaic operation on second image data output by the neural network processor 200 and may also be used to convert (or change) the format of the image data. For example, the main processor 300 may convert second image data from a tetra format to a Bayer format (or an RGB format) in order to generate third image data (e.g., full-color image data).

In some embodiments, the neural network processor 200 may perform all or some of pre-processing operations performed by the main processor 300, instead of using the main processor 300. For instance, the neural network processor 200 may remosaic the second image data in the tetra format to convert the second image data from a tetra format to a Bayer format. Alternatively, the neural network processor 200 may be used to demosaic the second image data having a Bayer format in order to generate the second image data having a RGB format.

Exemplary operations of the neural network processor 200, according to various embodiments, will be described in some additional detail with reference to FIGS. 6A to 10.

According to embodiments of the inventive concept, the image processing apparatus 1000 of FIG. 3 may perform a cluster-level bad pixel correction operation on bad pixel data resulting from various clusters using the neural network processor 200. Also, the image processing apparatus 1000 may perform pre-processing operation(s) and/or a post-processing operation(s) appropriate to the cluster-level bad pixel correction operation using the neural network processor 200. As a result, the image processing apparatus 1000 may generate a high-resolution and high-quality image.

Figure 4A:
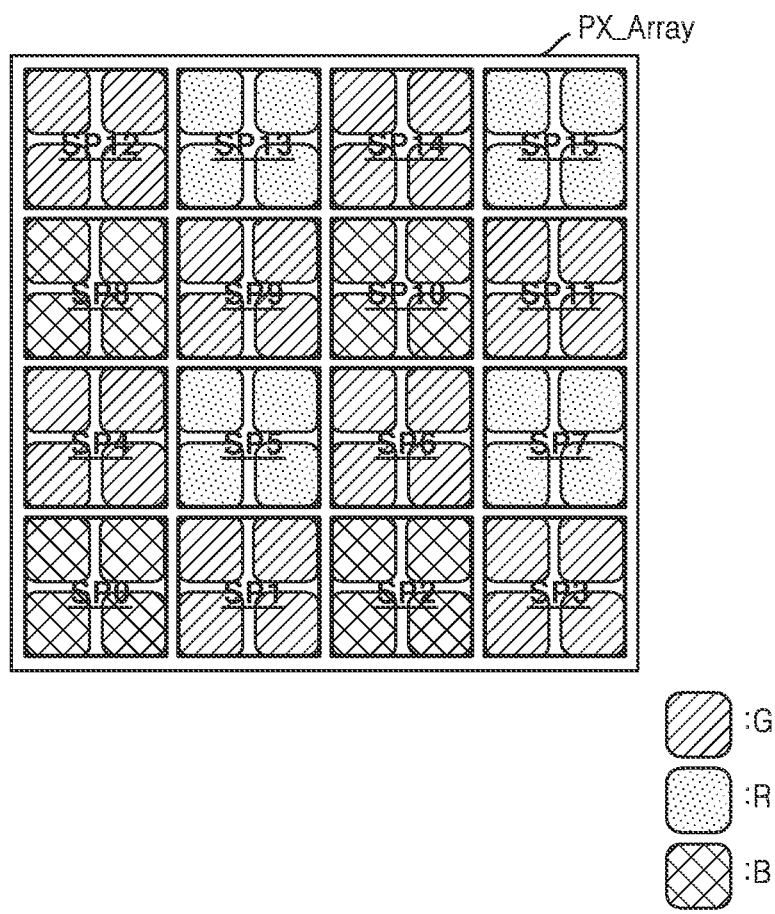
FIGS. 4A, 4B and 4C are respective diagrams of exemplary pixel arrays corresponding to a color filter array that may be used in the image processing apparatus of FIG. 3.
Figure 4B:
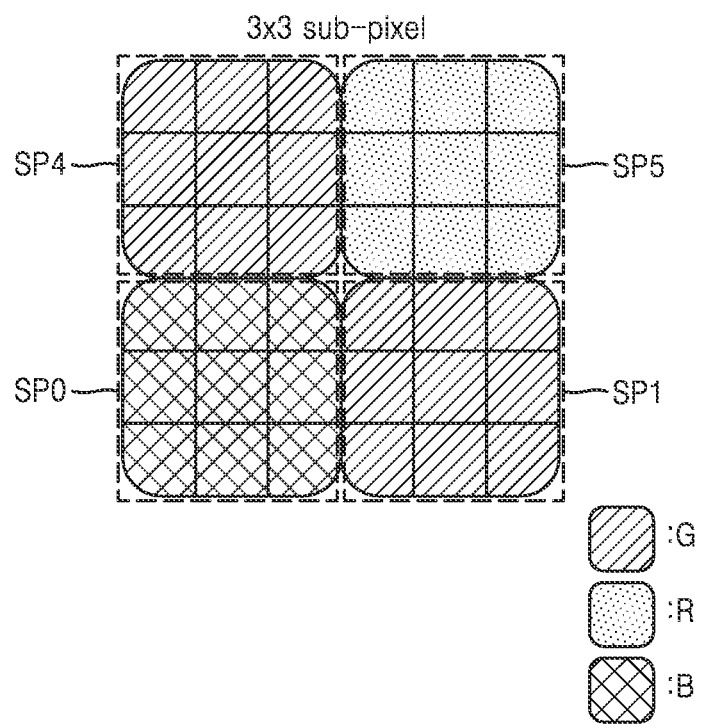
Figure 4C:
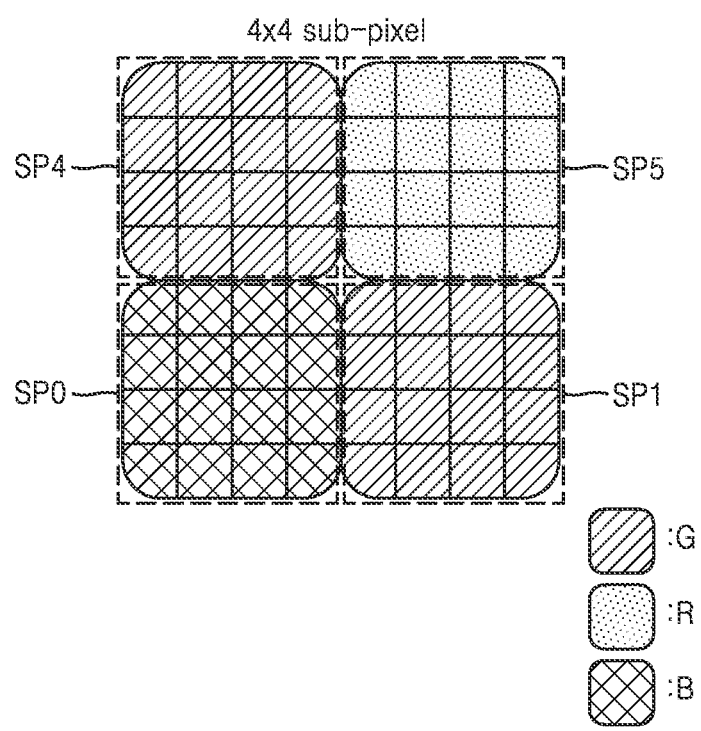

FIGS. 4A, 4B and 4C are conceptual diagrams illustrating various arrangements for a pixel array (PX_Array) that may be included in the color filter array 1110 of FIG. 3 according to embodiments of the inventive concept.

Referring to FIG. 4A, the pixel array may include pixels arranged in a matrix of rows and columns Here, a shared pixel may be defined as a unit including pixels arranged in two rows and two columns and including four (4) sub-pixels. Thus, each shared pixel may include four (4) photodiodes corresponding respectively to four (4) sub-pixels. Accordingly, the pixel array may include first to sixteenth shared pixels SP0 to SP15.

The pixel array (PX_Array) of FIG. 4A may further include a color filter, such that the first to sixteenth shared pixels SP0 to SP15 may sense various colors. As an example, the color filter may include filters configured to respectively sense red (R), green (G), and blue (B).

Each of the first to sixteenth shared pixels SP0 to SP15 may include sub-pixels in which the same color filter is positioned. For example, each of the first shared pixel SP0, the third shared pixel SP2, the ninth shared pixel SP8, and the eleventh shared pixel SP10 may include sub-pixels including a blue (B) color filter. Each of the second shared pixel SP1, the fourth shared pixel SP3, the fifth shared pixel SP4, the seventh shared pixel SP6, the tenth shared pixel SP9, the twelfth shared pixel SP11, the thirteenth shared pixel SP12, and the fifteenth shared pixel SP14 may include sub-pixels including a green (G) color filter. Each of the sixth shared pixel SP5, the eighth shared pixel SP7, the fourteenth shared pixel SP13, and the sixteenth shared pixel SP15 may include sub-pixels including a red (R) color filter.

In addition, each of a group including the first shared pixel SP0, the second shared pixel SP1, the fifth shared pixel SP4, and the sixth shared pixel SP5, a group including the third shared pixel SP2, the fourth shared pixel SP3, the seventh shared pixel SP6, and the eighth shared pixel SP7, a group including the ninth shared pixel SP8, the tenth shared pixel SP9, the thirteenth shared pixel SP12, and the fourteenth shared pixel SP13, and a group including the eleventh shared pixel SP10, the twelfth shared pixel SP11, the fifteenth shared pixel SP14, and the sixteenth shared pixel SP15 may be arranged in the pixel array to correspond to a Bayer pattern.

However, it should be noted at this point that the pixel array (PX_Array) of FIG. 4A is just one example of pixel array(s) and/or color filter(s) that may be used in relation to embodiments of the inventive concept. For example, the pixel array may include various types of color filters, such as filters respectively configured to sense yellow, cyan, magenta, and green colors. Alternately, the color filter may include filters respectively configured to sense red, green, blue, and white colors. Further, the pixel array may include a greater number of shared pixels than those described above, and the constituent shared pixels (e.g., SP0 to SP15) may be variously arranged.

In the illustrated embodiment of FIG. 4B, each of first, second, fifth, and sixth shared pixels SP0, SP1, SP4, and SP5 may respectively include nine (9) sub-pixels. The first shared pixel SP0 may include nine sub-pixels including a blue (B) color filter. Each of the second shared pixel SP1 and the fifth shared pixel SP4 may include nine sub-pixels including a green (G) color filter. The sixth shared pixel SP5 may include nine sub-pixels including a red (R) color filter. This particular arrangement of first, second, fifth, and sixth shared pixels SP0, SP1, SP4, and SP5 may be referred to as tetra cells.

In the illustrated embodiment of FIG. 4C, each of the first, second, fifth, and sixth shared pixels SP0, SP1, SP4, and SP5 may include sixteen (16) sub-pixels. The first shared pixel SP0 may include sixteen sub-pixels including a blue (B) color filter. Each of the second shared pixel SP1 and the fifth shared pixel SP4 may include sixteen sub-pixels including a green (G) color filter. The sixth shared pixel SP5 may include sixteen sub-pixels including a red (R) color filter. This particular arrangement of first, second, fifth, and sixth shared pixels SP0, SP1, SP4, and SP5 may be referred to as nonacells.

Figure 5A:
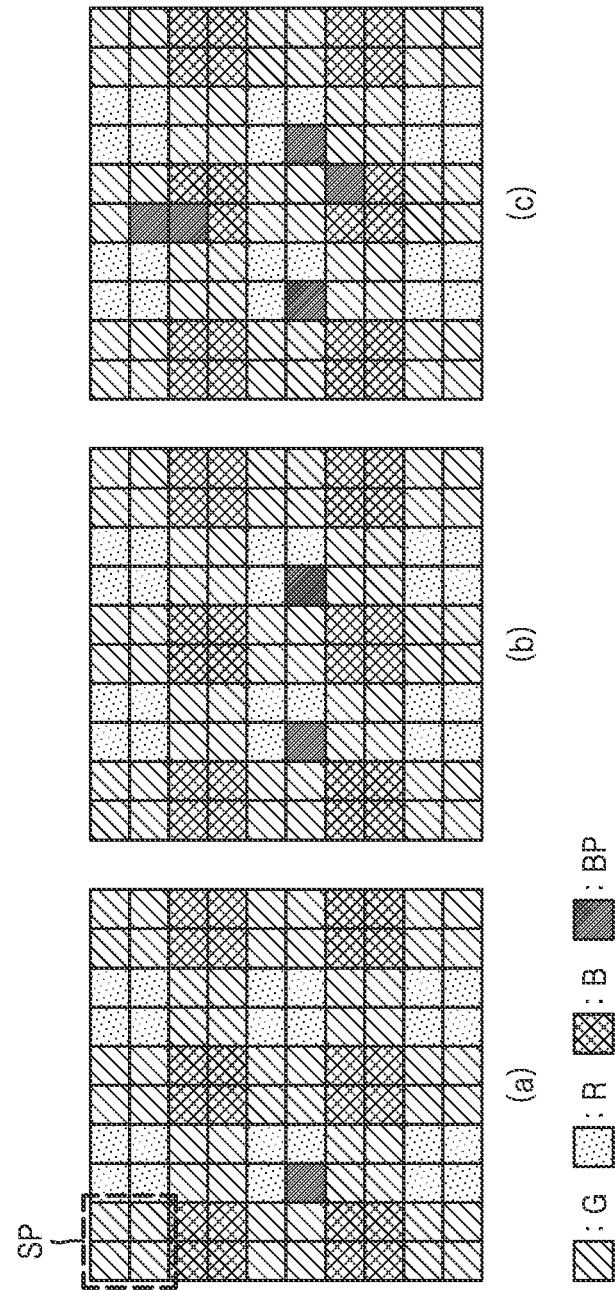

FIGS. 5A (including FIGS. 5A(a), 5A(b) and 5A(c)), and 5B (including FIGS. 5B(a), 5B(b), 5B(c), 5B(d) and 5B(e)) are respective, conceptual diagrams illustrating the presence of certain bad pixels (BP) included in a pixel array.

FIG. 5A(a) illustrates an example in which a pixel array includes one (1) bad pixel BP; FIG. 5A(b) illustrates an example in which a pixel array includes two (2) bad pixels BP that are isolated from each other; and FIG. 5A(c) illustrates an example in which a pixel array includes five (5) bad pixels BP that are deemed to be isolated from each other.

Thus, as suggested by the progression from FIG. 5A(a) to FIG. 5A(b) to FIG. 5A(c), an increasing number of bad pixels BP may be generated that are not continuous with each other. In such circumstances, a pixel-level bad pixel correction operation may be appropriate to correct for the bad pixels BP. Moreover, the bad pixels BP shown in FIG. 5A may be static bad pixel(s) or dynamic bad pixel(s).

In contrast, FIGS. 5B(a), 5B(b), 5B(c), 5B(d) and 5B(e) illustrate examples of a bad pixel cluster in which the constituent bad pixels BP are continuous with each other, and may form an arbitrary shape. Thus, in FIG. 5B(a), a single shared pixel SP may include four (4) bad pixels, thereby forming a cluster. In FIG. 5B(b), adjacent shared pixels SP may include sixteen (16) bad pixels BP continuously arranged with respect to one another, thereby forming a cluster. In FIG. 5B(c), different shared pixels SP may include twenty-five (25) bad pixels BP which are continuous with each other, thereby forming a multiple clusters. In FIG. 5B(d), ten (10) bad pixels BP arranged in parallel in an arbitrary axial direction may form a cluster having a line pattern across the pixel array (e.g., a line type cluster). In FIG. 5B(e), a mass of bad pixels BP may be arranged in a so-called scratch type cluster across the pixel array.

Thus, as illustrated in FIGS. 5B(a), 5B(b), 5B(c), 5B(d) and 5B(e), a number of bad pixels BP may be continuous with each other in a variety of ways to form clusters of varying types. In such circumstances, a cluster-level bad pixel correction operation may be appropriate to correct for the bad pixels BP.

Figure 6A:
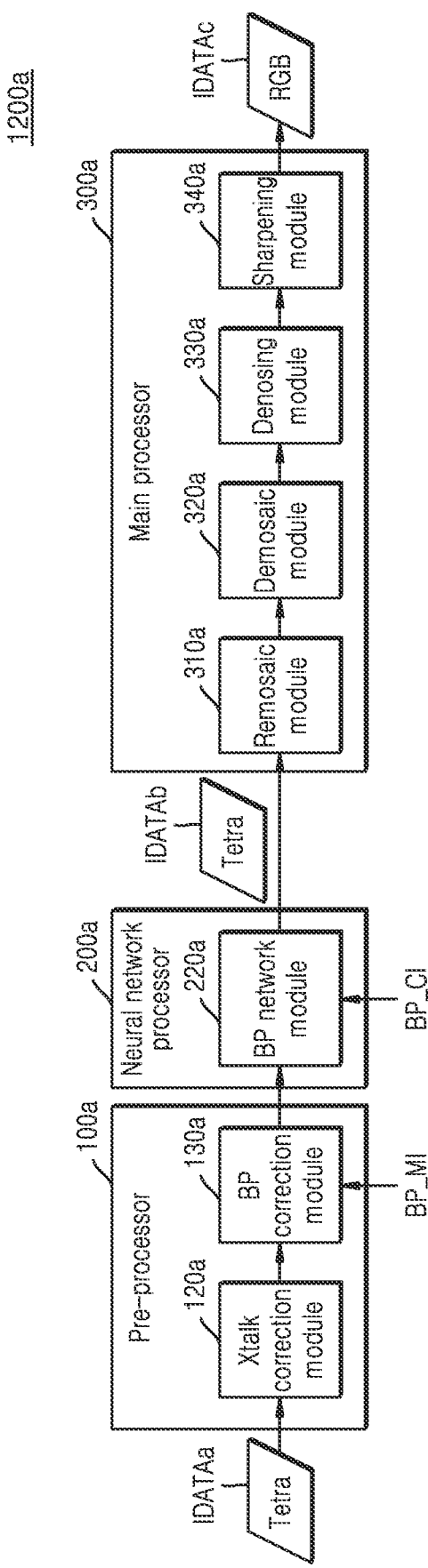
FIGS. 6A, 6B, 8A and 9 are respective block diagrams variously illustrating operation of neural network processors according to embodiments of the inventive concept.
Figure 6B:
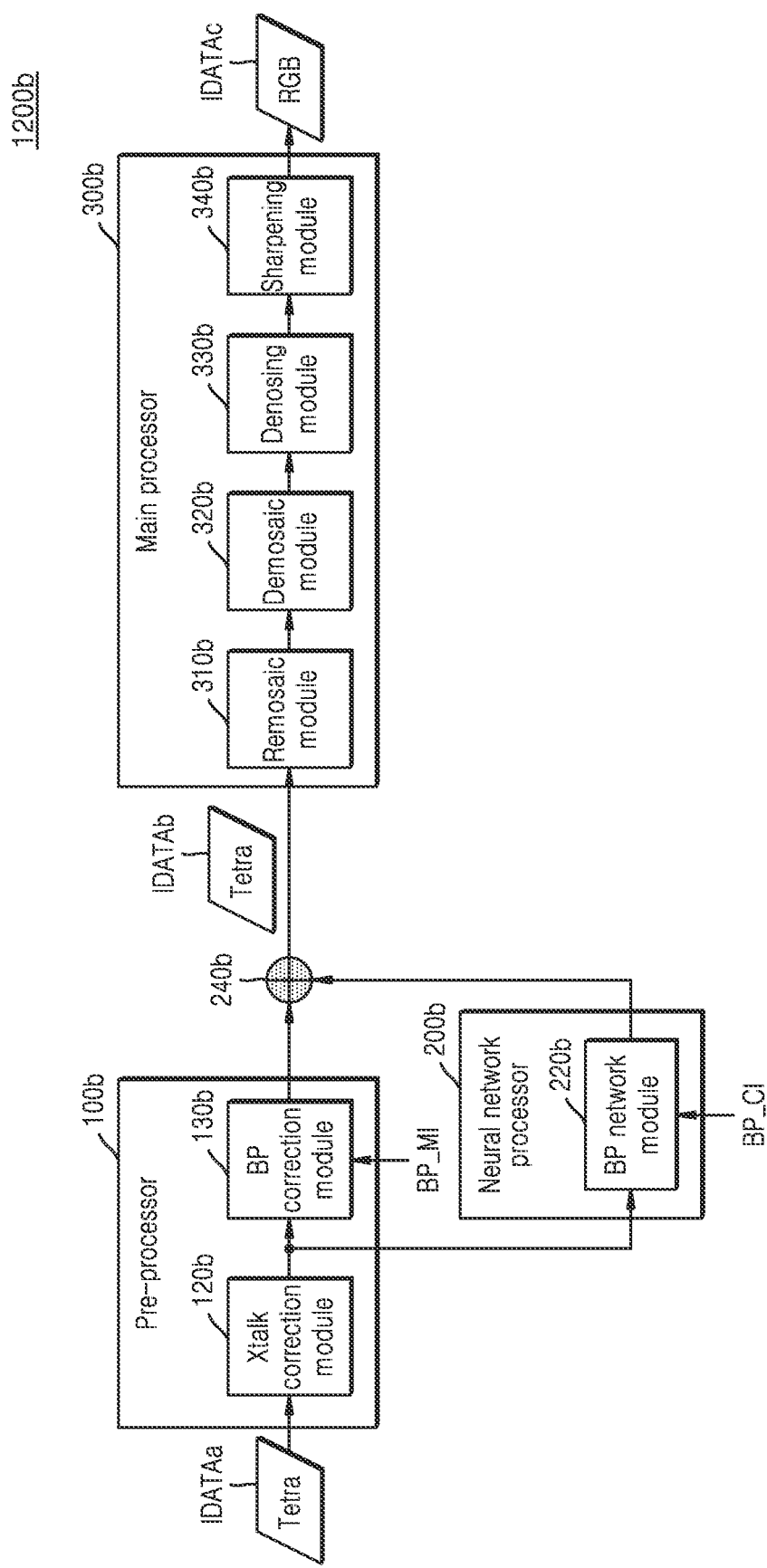

FIGS. 6A and 6B are respective block diagrams further illustrating possible operations for respective image processing systems 1200a and 1200b according to embodiments of the inventive concept. Here, it should be noted that the inventive concept is not limited to the embodiments illustrated in FIGS. 6A and 6B. For example, the image processing systems 1200a and 1200b may further include additional modules configured to provide pre-processing operation(s) and/or post-processing operation(s).

Referring to FIG. 6A, the image processing system 1200a may include a pre-processor 100a, the neural network processor 200a and a main processor 300a. The pre-processor 100a may include an X-talk correction module 120a and a bad pixel (BP) correction module 130a. The neural network processor 200a may include a BP network module 220a. The main processor 300a may include a remosaic module 310a, a demosaic module 320a, a denoising module 330a, and a sharpening module 340a.

The pre-processor 100a may receive first image data (IDATAa) having a tetra format (hereinafter, "first tetra data") and perform pre-processing operations including an X-talk correction operation and a pixel-level bad pixel correction operation on the first tetra data. That is, the BP correction module 130a may perform a pixel-level bad pixel correction operation based on masking information BP_MI. The masking information BP_MI may include location information for isolated bad pixels as illustrated in FIG. 6A. Furthermore, the masking information BP_MI may include location information for bad pixels included in cluster(s) as illustrated in FIG. 6B.

The BP network module 220a may then (1) receive the pixel-level corrected, first tetra data from the pre-processor 100a, (2) perform a cluster-level bad pixel correction operation on the pixel-level corrected, tetra data based on coordinate information BP_CI, in order to (3) generate second tetra data (IDATAb). That is, in some embodiments, the BP network module 220a may (1) select ROI data included in the first tetra data, (2) detect pixel data corresponding to clusters from among the ROI data, and (3) perform a cluster-level bad pixel correction operation. Here, the coordinate information BP_CI may include coordinates for pixel data respectively including at least some of the ROI data. The coordinate information BP_CI may be generated based on the masking information BP_MI.

In some embodiments, the neural network processor 200a may (1) extract location information for bad pixels included in the masking information BP_MI using coordinates of the bad pixels, (2) select optimum ROI data for the cluster-level bad pixel correction operation, and (3) generate the coordinate information BP_CI. The neural network processor 200a may obtain the masking information BP_MI during an operation of producing the image processing apparatus 1200a to generate the coordinate information BP_CI, and store the coordinate information BP_CI in a non-volatile memory of the image processing apparatus 1200a. In some embodiments, the BP network module 220a may perform a white balance operation on the first tetra data before performing the cluster-level bad pixel correction operation.

The main processor 300a may receive the second tetra data (IDATAb) from the neural network processor 200a. The remosaic module 310a may convert the second tetra data into corresponding data having a Bayer pattern, and the demosaic module 320a may then convert data having a Bayer pattern to data having a RGB pattern (IDATAc) (e.g., full-color image data). Subsequently, the denoising module 330a may perform an operation of removing noise from the RGB data, and the sharpening module 340a may perform a sharpening operation on the RGB data. The main processor 300a may perform post-processing operation(s) described above in relation to the second tetra data (IDATAb) and/or the RGB data (IDATAc).

Referring to FIG. 6B, the image processing system 1200b may include a pre-processor 100b, a neural network processor 200b, an image merge unit 240b, and a main processor 300b. Hereinafter, differences between the neural network processor 200a of FIG. 6A and the neural network processor 200b of FIG. 6B will be primarily described.

The neural network processor 200b may directly receive the first tetra data (IDATAa) from the X-talk correction module 120b. A BP network module 220b may operate in parallel with a BP correction module 130b. That is, the BP network module 220b may perform a cluster-level bad pixel correction operation on the first tetra data. In parallel with the cluster-level bad pixel correction operation, the BP correction module 130b may perform a pixel-level bad pixel correction operation on the first tetra data. The image merge unit 240b may then merge data output by the BP correction module 130b with data output by the BP network module 220b in order to generate the second tetra data (IDATAb).

Figure 7A:
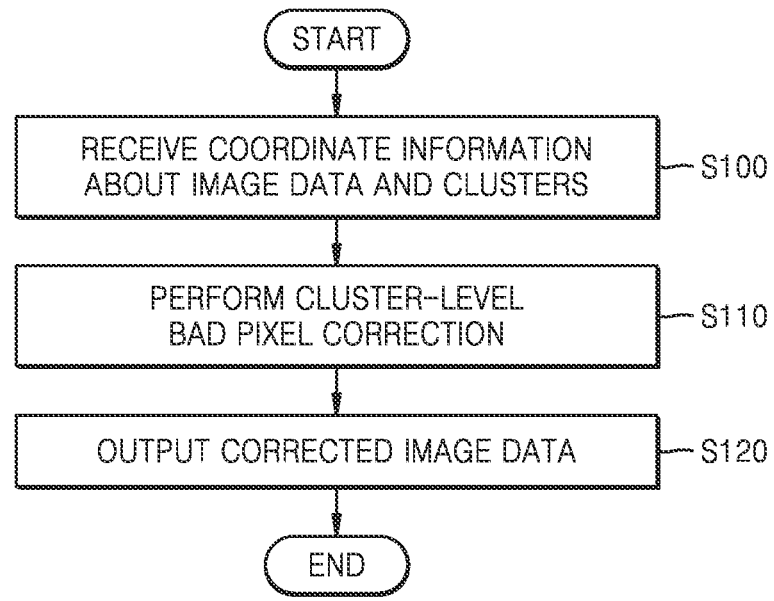
FIGS. 7A and 7B are diagrams further illustrating cluster-level bad pixel correction operations according to embodiments of the inventive concept.
Figure 7B:
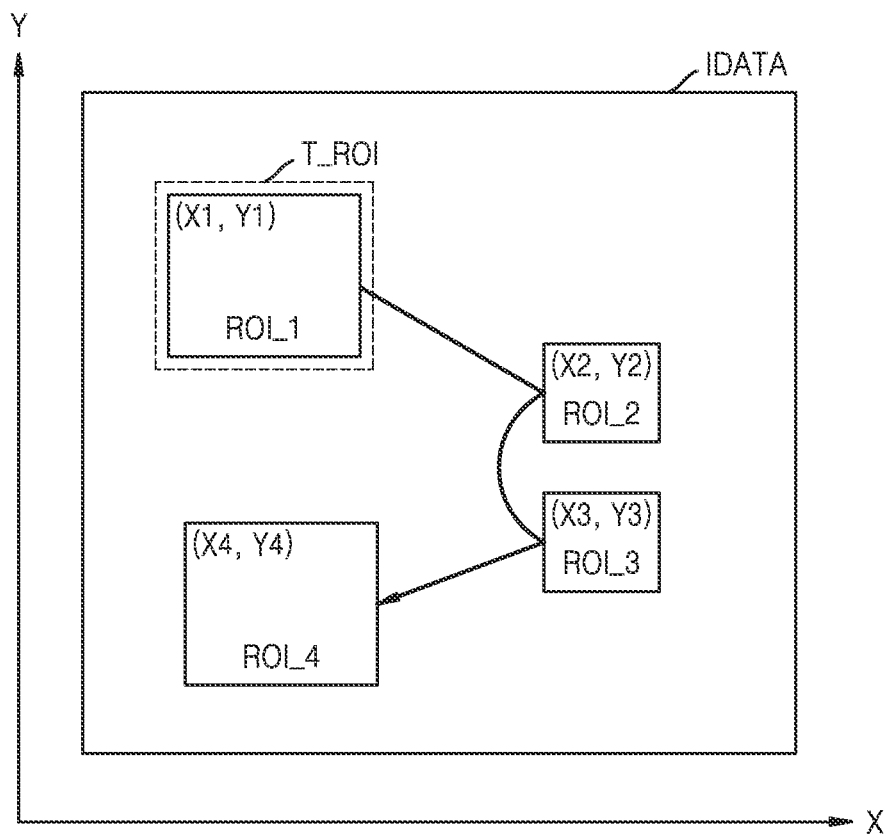

FIG. 7A is a flowchart further illustrating a cluster-level bad pixel correction operation according to embodiments of the inventive concept, and FIG. 7B is a conceptual diagram illustrating one possible make-up of a data block (IDATA).

Referring to FIG. 7A, a neural network processor may receive coordinate information for image data and clusters, each of which may include bad pixel(s) (S100). Thereafter, the neural network processor may select ROI data from the image data based on coordinate information, detect pixel data corresponding to clusters from the ROI data, and perform a bad pixel correction operation on the detected pixel data (S110), in order to output corrected image data (IDATA) (S120).

Referring further to FIG. 7B, the image data (IDATA) may include ROI data (e.g., first to fourth ROI data ROI_1 to ROI_4). Here, the first to fourth ROI data ROI_1 to ROI_4 may be sequentially selected as target ROI data T_ROI, and thus, pixel data corresponding to clusters—each of which includes bad pixel(s)—may be detected. Coordinate information may include first to fourth coordinates ((X1, Y1) to (X4, X4)) for the pixel data respectively indicating the first to fourth ROI data ROI_1 to ROI_4. For example, a neural network processor may detect the first ROI data ROI_1 using the first coordinate (X1, Y1). The ROI data may be variously sizes. However, in some embodiments, the respective ROI data may have the same size. When the respective ROI data has different sizes, the coordinate information may further include size information for the ROI data.

Thus, in some embodiments, a neural network processor consistent with embodiments of the inventive concept may perform a cluster-level bad pixel correction operation by optionally using selected ROI data based on the coordinate information in order to enable a rapid image processing operation.

Figure 8A:
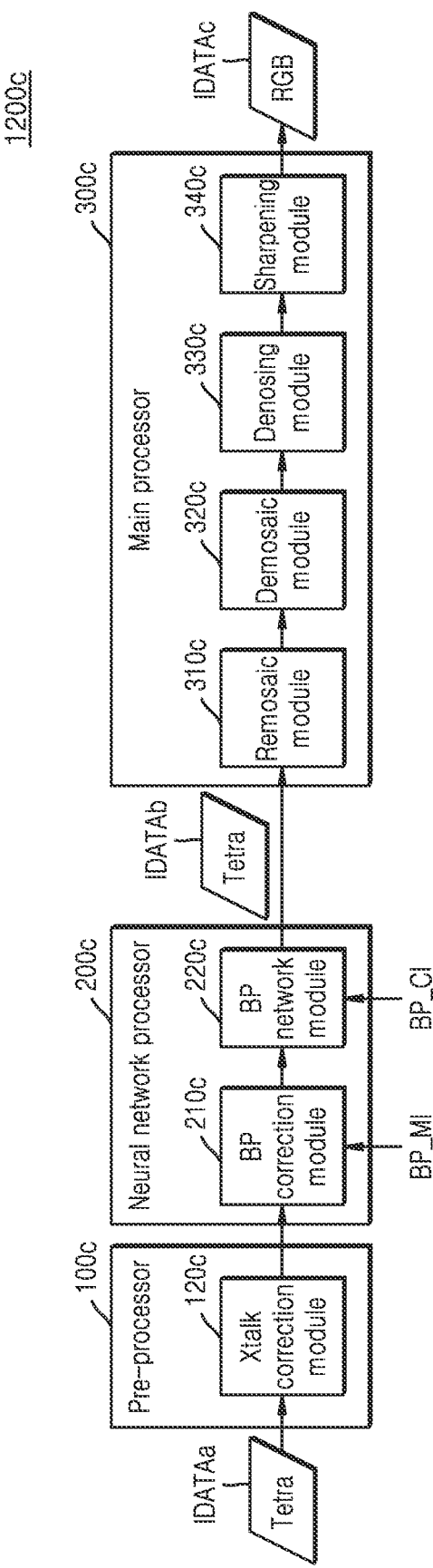
Figure 8B:
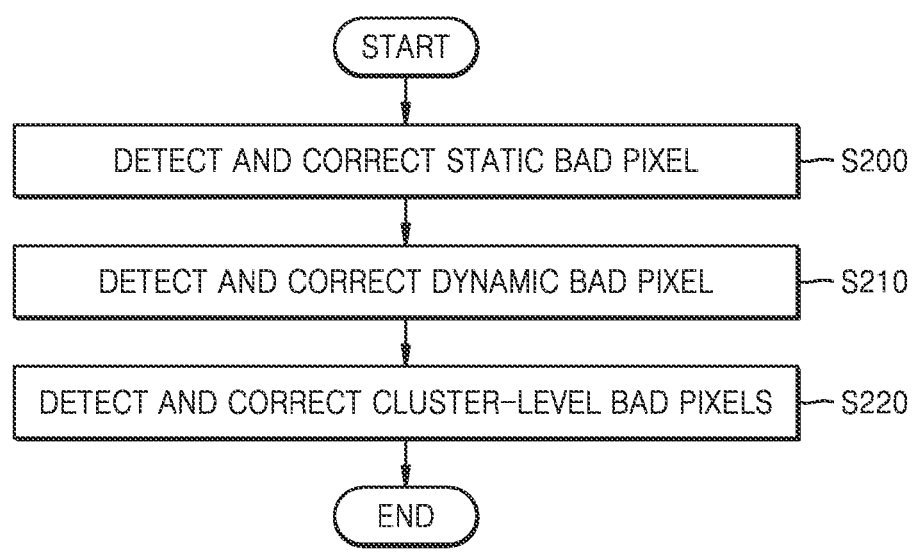
FIG. 8B is a flowchart illustrating in one example operation of a neural network processor according to embodiments of the inventive concept.

FIGS. 8A and 8B are diagrams for describing the possible operation of a neural network processor 200c in an image processing system 1200c according to embodiments of the inventive concept.

Referring to FIG. 8A, the image processing system 1200c may include a pre-processor 100c, the neural network processor 200c, and a main processor 300c. Hereinafter, differences between the neural network processor 200a of FIG. 6A and the neural network processor 200c of FIG. 8A will be primarily described.

In some embodiments, the neural network processor 200c may include a BP correction module 210c and a BP network module 220c. The BP correction module 210c may receive first tetra data (IDATAa) from an X-talk correction module 120c of the pre-processor 100c and perform a pixel-level bad pixel correction operation based on masking information BP_MI. Subsequently, the BP network module 220c may perform a cluster-level bad pixel correction operation on the first tetra data received from the BP correction module 210c in order to generate second tetra data (IDATAb).

Referring to FIG. 8B, the BP correction module 210c may detect at least one static bad pixel based on the masking information BP_MI and correct pixel data corresponding to the at least one static bad pixel (S200). The BP correction module 210c may detect at least one dynamic bad pixel, based on the masking information BP_MI and/or a correction result for the at least one static bad pixel, and correct pixel data corresponding to the at least one dynamic bad pixel (S210). Following the correction of the at least one static bad pixel and the correction of the at least one dynamic bad pixel (S200 and S210), the BP network module 220c may perform a cluster-level bad pixel correction operation on image data (S220). However, the inventive concept is not limited to only this approach, and the cluster-level bad pixel correction operation on the image data may be followed by the pixel-level bad pixel correction operation.

Figure 9:
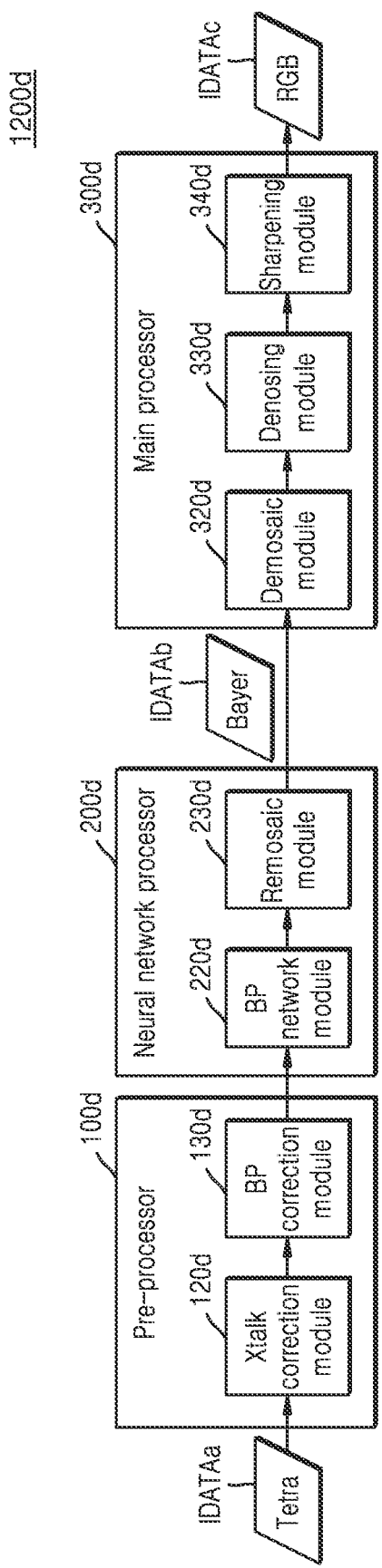
Figure 10:
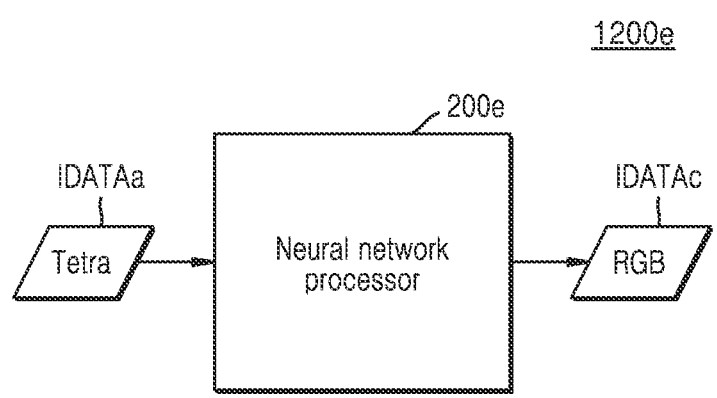
FIG. 10 is block diagram illustrating in one example operation of neural network processors according to embodiments of the inventive concept.

FIGS. 9 and 10 are block diagrams further illustrating possible operation of neural network processors 200d and 200e according to embodiments of the inventive concept.

Referring to FIG. 9, an image processing system 1200d may include a pre-processor 100d, a neural network processor 200d, and a main processor 300d. Hereinafter, differences between the neural network processor 200a of FIG. 6A and the neural network processor 200d of FIG. 9 will be primarily described.

The neural network processor 200d may include a BP network module 220d and a remosaic module 230d. The remosaic module 230d may remosaic tetra data output by the BP network module 220d and convert the tetra data into data having a Bayer format (IDATAb). The remosaic module 230d may output the data having the Bayer format to the main processor 300d. The main processor 300d may include a demosaic module 320d, a denoising module 330d, and a sharpening module 340d. Thus, the main processor 300d may post-process the data having the Bayer format in order to generate RGB data (IDATAc).

Referring to FIG. 10, an image processing system 1200e may include a neural network processor 200e. As compared to FIG. 6A, the neural network processor 200e may perform a pre-processing operation, a pixel-level bad pixel correction operation, a cluster-level bad pixel correction operation, and a post-processing operation on the first tetra data (IDATAa) in order to generate RGB data (IDATAc). That is, the neural network processor 200e may be used to perform all of the operations described in relation to the pre-processor 100a and the post-processor 300a of FIG. 6A.

Figure 11:
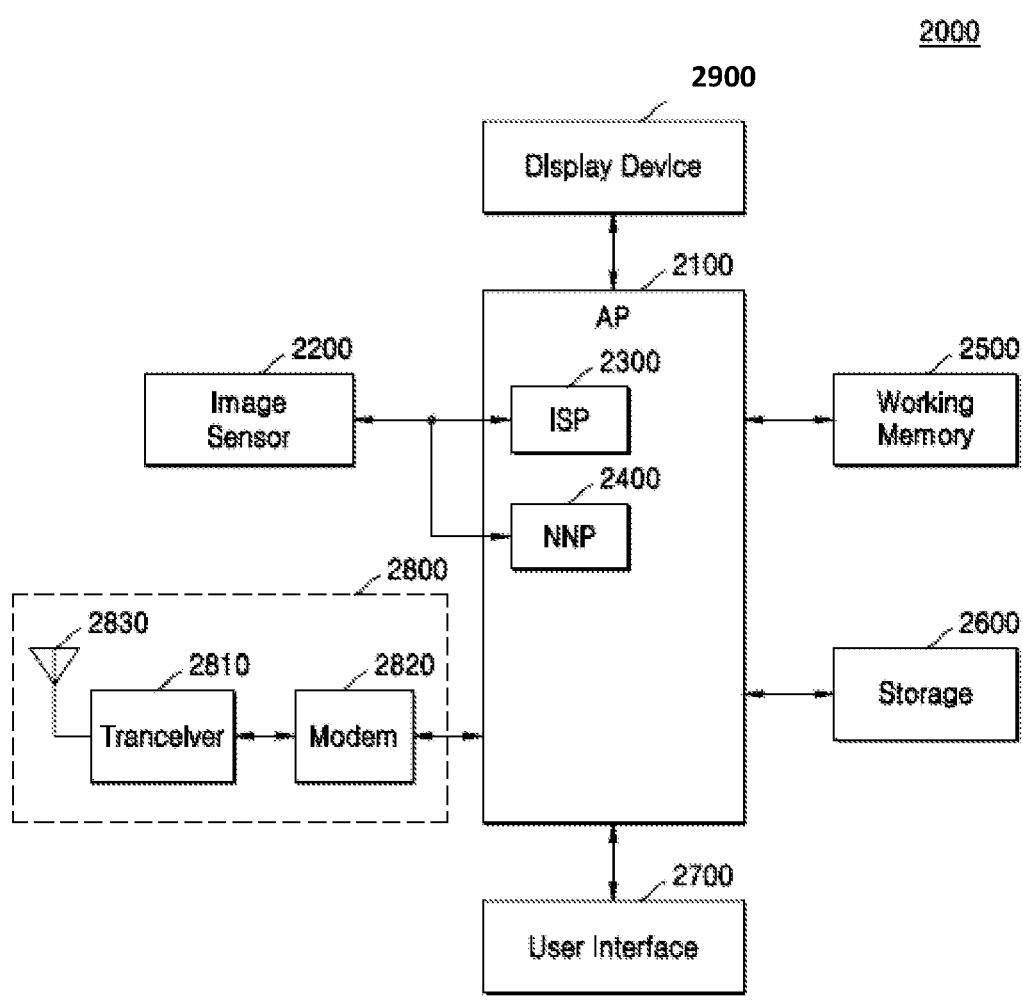
FIG. 11 is a block diagram of an image processing apparatus according to embodiments of the inventive concept.

FIG. 11 is a block diagram illustrating an image processing apparatus 2000 according to an embodiments of the inventive concept. Here, the image processing apparatus 2000 is assumed to be a portable terminal.

Referring to FIG. 11, the image processing apparatus 2000 may include an application processor (AP) 2100, an image sensor 2200, a display device 2900, a working memory 2500, a storage 2600, a user interface 2700 and a wireless transceiving unit 2800. The AP 2100 may include an image signal processor (ISP) 2300 and a neural network processor (or NNP) 2400. An image processing method described in relation to the embodiment of FIG. 1 may be applied to the ISP 2300 and the NNP 2400. In some embodiments, the ISP 2300 and the NNP 2400 may be implemented as integrated circuits (ICs) separate from the AP 2100.

The AP 2100 may control operation of the image processing apparatus 2000 and may be implemented as a System-on-Chip (SoC) configured to drive one or more application program(s) and/or operating system(s).

In this regard, the AP 2100 may control operation of the ISP 2300 and provide converted image data generated by the ISP 2300 to the display device 2900, and/or store the converted image in the storage 2600.

The image sensor 2200 may generate image data (e.g., raw image data) based on a received optical signal, and provide the image data to the ISP 2300.

The working memory 2500 may be implemented as a volatile memory (e.g., DRAM and SRAM) or a non-volatile memory (e.g., FeRAM, RRAM and PRAM). The working memory 2500 may store programs and/or data processed or executed by the AP 2100.

The storage 2600 may be implemented as a non-volatile memory device, such as a NAND flash device and a resistive memory. For example, the storage 2600 may be provided as a memory card (e.g., a multi-media card (MMC), an embedded MMC (eMMC), a secure digital (SD) card, and a micro-SD card). The storage 2600 may store data and/or programs for execution algorithms for controlling an image processing operation of the ISP 2300. The data and/or the programs may be loaded into the working memory 2500 during the image processing operation. In an embodiment, the storage 2600 may store image data (e.g., converted image data or post-processed image data) generated by the ISP 2300.

The user interface 2700 may be implemented as one of various devices capable of receiving a user's inputs, such as a keyboard, a button key panel, a touch panel, a fingerprint sensor, and a microphone. The user interface 2700 may receive the user's inputs and provide signals corresponding to the user's inputs to the AP 2100.

The wireless transceiving unit 2800 may include a transceiver 2810, a modem 2820, and an antenna 2830.

While the inventive concept has been particularly shown and described with reference to embodiments thereof, it will be understood that various changes in form and details may be made therein without departing from the scope of the following claims.

What is claimed is:

1. An image processing apparatus comprising:
   an image sensor including pixels that generate first image data; and
   an image processing system including;
      a neural network processor configured to receive first coordinate information associated with first-type bad pixel clusters, and to perform a cluster-level bad pixel correction operation on the first image data based on the first coordinate information to generate second image data, and
      a main processor configured to perform a post-processing operation on the second image data to generate third image data.

2. The image processing apparatus of claim 1, wherein the neural network processor is further configured to select region of interest (ROI) data included in the first image data based on the first coordinate information, and detect pixel data corresponding to the clusters from the ROI data.

3. The image processing apparatus of claim 2, wherein the first coordinate information includes coordinates for pixel data respectively indicating the ROI data.

4. The image processing apparatus of claim 1, further comprising:
   a non-volatile memory configured to store the first coordinate information.

5. The image processing apparatus of claim 1, further comprising:
   a pre-processor configured to receive second coordinate information associated with second-type bad pixels, and to perform a pixel-level bad pixel correction operation on the first image data based on the second coordinate information to generate pixel-level corrected first data.

6. The image processing apparatus of claim 5, wherein the neural network processor is further configured to perform the cluster-level bad pixel correction operation on the pixel-level corrected first image data to generate the second image data.

7. The image processing apparatus of claim 5, wherein the neural network processor is further configured to perform the cluster-level bad pixel correction operation in parallel with performing of the pixel-level bad pixel correction operation by the pre-processor to generate cluster-level corrected first image data, and
   the main processor is further configured to merge the pixel-level corrected first image data with the cluster-level corrected first image data to generate the third image data.

8. The image processing apparatus of claim 1, wherein the neural network processor is further configured to receive second coordinate information associated with second-type bad pixels, and to perform a pixel-level bad pixel correction operation on the first image data based on the second coordinate information, and thereafter,
   the cluster-level bad pixel correction operation is performed by the neural network processor on the pixel-level corrected first image data.

9. The image processing apparatus of claim 8, wherein the pixels include at least one static bad pixel and at least one dynamic bad pixel, and
   the neural network processor is further configured to detect pixel data corresponding to the at least one static bad pixel and the at least one dynamic bad pixel from the first image data by referring to the second coordinate information to generate detected pixel data, and correct the detected pixel data.

10. The image processing apparatus of claim 1, wherein the pixels include at least one of tetra cells and nonacells.

11. The image processing apparatus of claim 1, wherein the neural network processor is further configured to perform at least one of a crosstalk (X-talk) correction operation on the first image data, and a remosaic operation on the second image data.

12. The image processing apparatus of claim 1, wherein the neural network processor is further configured to perform a white balance operation on the first image data before performing the cluster-level bad pixel correction operation.

13. The image processing apparatus of claim 1, wherein the first image data and the second image data are both tetra data, and
   the third image data is red-green-blue (RGB) data.

14. The image processing apparatus of claim 1, wherein at least one of a plain residual network, a dense network, a hierarchical pyramid network, and a fully convolutional network is applied in the image processing apparatus.

15. The image processing apparatus of claim 1, wherein the third image data is full-color image data, and
   the main processor is further configured to perform a remosaic operation on the second image data to generate image data having a second pattern, and perform a demosaic operation on the image data having the second pattern to generate the full-color image data.

16. The image processing apparatus of claim 1, wherein the clusters include at least one of a scratch type cluster and a line type cluster.

17. An image processing system comprising:
- a pre-processor that receives first tetra data and includes a bad pixel module that performs a pixel-level bad pixel correction operation on the first tetra data to generate pixel-level corrected first tetra data;
- a neural network processor including a bad pixel network module that receives coordinate information and the pixel-level corrected first tetra data and performs a cluster-level bad pixel correction operation based on the coordinate information to generate second tetra data; and
- a main processor that receives the second tetra data, and includes:
  - a remosaic module that converts the second tetra data into corresponding data having a Bayer pattern;
  - a demosaic module that converts the data having the Bayer pattern in corresponding data having a red-green-blue (RGB) pattern;
  - a denoising module that removes noise from the data having the RGB pattern; and
  - a sharpening module that performs a sharpening operation on the data having the RGB pattern.

18. The image processing system of claim 17, wherein the pre-processor further includes a cross-talk correction module that performs a cross-talk correction operation of the first tetra data before the pixel-level bad pixel correction operation is performed, and the pixel-level bad pixel correction operation is based on masking information including location information indicating second-type bad pixels.

19. The image processing system of claim 17, wherein the neural network processor extracts location information for first-type bad pixels included in masking information for a pixel array and selects optimum region of interest data for the cluster-level bad pixel correction operation to generate the coordinate information.

20. A method of operating an image processing apparatus including an image sensor including pixels, a neural network processor and a main processor, the method comprising:

generating first image data using the pixels;

performing a cluster-level bad pixel correction operation on the first image data using the neural network processor and based on coordinate information associated with a cluster including a bad pixel from among the pixels to generate second image data, the coordinate information received by the neural network processor; and performing a post-processing operation on the second image data using the main processor to generate third image data.

* * * * *